United States Patent
Bhae et al.

(10) Patent No.: US 9,020,703 B2
(45) Date of Patent: Apr. 28, 2015

(54) POWER STEERING APPARATUS CAPABLE OF SENSING MOISTURE

(71) Applicant: Mando Corporation, Pyeongtaek-si, Gyeonggi-do (KR)

(72) Inventors: Hong Yong Bhae, Yongin-si (KR); Hyun Chul Tae, Wonju-si (KR)

(73) Assignee: Mando Corporation, Pyeongtaek-Si, Gyeonggi-Do (KR)

( * ) Notice: Subject to any disclaimer, the term of this patent is extended or adjusted under 35 U.S.C. 154(b) by 170 days.

(21) Appl. No.: 13/685,255

(22) Filed: Nov. 26, 2012

(65) Prior Publication Data

US 2013/0138299 A1    May 30, 2013

(30) Foreign Application Priority Data

Nov. 24, 2011 (KR) .................. 10-2011-0123620

(51) Int. Cl.
*B60R 25/04* (2013.01)
*B62D 6/00* (2006.01)
*B62D 5/04* (2006.01)

(52) U.S. Cl.
CPC .............. *B62D 6/00* (2013.01); *B62D 5/0406* (2013.01); *B62D 5/0481* (2013.01); *B62D 5/0484* (2013.01)

(58) Field of Classification Search
CPC ............. B60R 25/04; B60R 25/1004; B60R 2325/306; B62D 6/10; B62D 5/0448; B62D 5/0424; B62D 5/0484; B62D 5/0412; B62D 5/0421; F16H 55/18; F16H 25/2214; Y10T 74/19; Y10T 74/19977; Y10T 74/19753; B62H 5/00; H02P 6/08; H02P 6/10; H02P 6/16
USPC ............ 701/2; 180/443, 444, 446; 340/425.5, 340/652; 318/400.04
See application file for complete search history.

(56) References Cited

U.S. PATENT DOCUMENTS 4,681,182 A * 7/1987 Suzuki et al. ................. 180/444
7,284,634 B2 * 10/2007 Tatewaki et al. ............. 180/444

(Continued)

FOREIGN PATENT DOCUMENTS

CN      102030032 A    4/2011
DE       3425389 A1    2/1985

(Continued)

*Primary Examiner* — James Trammell
*Assistant Examiner* — Sanjeev Malhotra
(74) *Attorney, Agent, or Firm* — McDermott Will & Emery LLP

(57) ABSTRACT

A power steering apparatus includes: a torque sensor for detecting a steering torque applied to a steering wheel and outputting a torque signal corresponding to the steering torque; a speed sensor for detecting a speed of a vehicle and outputting a speed signal corresponding to the speed of the vehicle; a humidity sensor for outputting a humidity signal corresponding to a humidity of an interior of the power steering apparatus; and an electronic control unit for receiving the humidity signal from the humidity sensor, and for, when a measured humidity is an reference value or higher, generating a motor current signal for supplying an assistant steering force smaller than an assistant force set in response to the torque signal and the speed signal.

6 Claims, 3 Drawing Sheets

(56) References Cited

U.S. PATENT DOCUMENTS

| | | | |
|---|---|---|---|
| 7,315,236 B2* | 1/2008 | Yanagida et al. | 340/425.5 |
| 7,341,125 B2* | 3/2008 | Yamamoto | 180/446 |
| 2002/0148672 A1* | 10/2002 | Tatewaki et al. | 180/443 |
| 2004/0188171 A1* | 9/2004 | Mizuhara et al. | 180/444 |
| 2006/0017584 A1* | 1/2006 | Yanagida et al. | 340/652 |
| 2006/0021822 A1* | 2/2006 | Yamamoto | 180/446 |
| 2011/0060481 A1* | 3/2011 | Kang et al. | 701/2 |
| 2012/0262097 A1* | 10/2012 | Yamato et al. | 318/400.04 |

FOREIGN PATENT DOCUMENTS

| | | |
|---|---|---|
| DE | 10249370 A1 | 5/2004 |
| DE | 102006051799 A1 | 5/2008 |
| DE | 102007014345 A1 | 10/2008 |
| JP | 2011-088587 A | 5/2011 |

* cited by examiner

POWER STEERING APPARATUS CAPABLE OF SENSING MOISTURE

CROSS-REFERENCE TO RELATED APPLICATION

This application claims priority from and the benefit under 35 U.S.C. §119(a) of Korean Patent Application No. 10-2011-0123620, filed on Nov. 24, 2011, which is hereby incorporated by reference for all purposes as if fully set forth herein.

BACKGROUND OF THE INVENTION

1. Field of the Invention

The present invention relates to a power steering apparatus capable of sensing moisture.

2. Description of the Prior Art

The present invention relates to a power steering apparatus of a vehicle, and more particularly to a power steering apparatus capable of sensing moisture.

A power steering apparatus of a vehicle supplies an assistant force for assisting a manipulation force of a driver when a steering wheel is manipulated by the driver. An assistant force supplied by the power steering apparatus is changed according to a speed of the vehicle.

For example, when a speed of the vehicle is high, the power steering apparatus reduces a magnitude of an assistant force, compelling the driver to apply a relatively large force to manipulate the steering wheel. Accordingly, the driver can safely drive the vehicle at a high speed. Further, when a speed of the vehicle is low, the power steering apparatus can increase a magnitude of the assistant force, allowing the driver to manipulate the steering wheel with a small force. Accordingly, the driver can easily drive the vehicle travelling at a low speed.

The power steering apparatus may be influenced by water or moisture introduced from the outside during an operation thereof, and if the influence is strong, the power steering apparatus may not be normally operated, lowering a travel stability of the vehicle.

SUMMARY OF THE INVENTION

Accordingly, the present invention has been made to solve the above-mentioned problems occurring in the prior art, and an object of the present invention is to provide a power steering apparatus capable of detecting moisture.

In accordance with an aspect of the present invention, a power steering apparatus includes: a torque sensor for detecting a steering torque applied to a steering wheel and outputting a torque signal corresponding to the steering torque; a speed sensor for detecting a speed of a vehicle and outputting a speed signal corresponding to the speed of the vehicle; a humidity sensor for outputting a humidity signal corresponding to a humidity of an interior of the power steering apparatus; and an electronic control unit for receiving the humidity signal from the humidity sensor, and for, when a measured humidity is an reference value or higher, generating a motor current signal for supplying an assistant steering force smaller than an assistant force set in response to the torque signal and the speed signal.

The power steering apparatus may further include: an alarm unit for, when the electronic control unit outputs an alarm signal as the measured humidity is the reference value or higher, receiving the alarm signal from the electronic control unit and outputting an alarm.

The humidity sensor may be moduled with at least one of the torque sensor and the electronic control unit.

The humidity sensor may be installed within a housing covering a ball screw unit operated according to a driving force of an electric motor to which a current corresponding to a motor current signal is supplied.

The humidity sensor may be installed on a bottom surface of the housing adjacent to the ground surface.

The humidity sensor may be installed in a region of the housing coupled to the cover covering a tie rod or adjacent to a region of the housing coupled to the cover.

As described above, according to the present invention, a stable operation of a power steering apparatus can be secured by measuring moisture which may influence the power steering apparatus.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
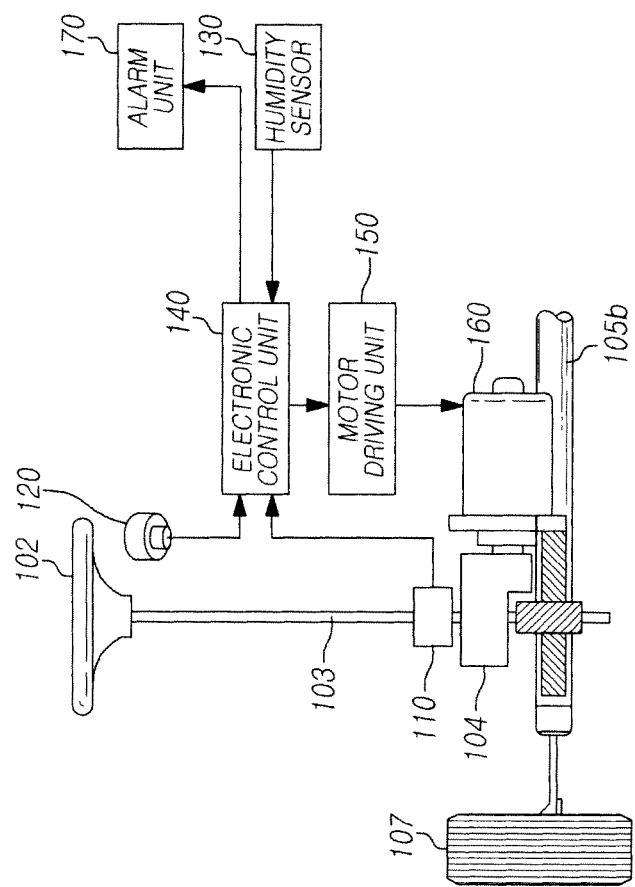
FIG. 1 illustrates a power steering apparatus according to an embodiment of the present invention.

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected", "coupled" or "joined" to another component, a third component may be "connected", "coupled", and "joined" between the first and second components, although the first component may be directly connected, coupled or joined to the second component.

Hereinafter, a power steering apparatus according to an embodiment of the present invention will be described in detail with reference to the accompanying drawings.

FIG. 1 illustrates a power steering apparatus according to an embodiment of the present invention. As illustrated in FIG. 1, the power steering apparatus according to the embodiment of the present invention includes a torque sensor 110, a speed sensor 120, a humidity sensor 130, and an electronic control unit 140.

The torque sensor 110 detects a steering torque applied to a steering wheel 102, and outputs a torque signal corresponding to the steering torque.

The speed sensor 120 detects a speed of the vehicle, and outputs a speed signal corresponding to the speed of the vehicle.

The humidity sensor 130 outputs a humidity signal corresponding to a humidity of an interior of the power steering apparatus. In the embodiment of the present invention, the humidity sensor 130 may be a sensor for sensing gaseous moisture, or may be a sensor for sensing liquid-state water. Further, in the embodiment of the present invention, the humidity sensor 130 may be an electric resistance humidity sensor a resistance of which is varied when humidity or water is detected, or may be a capacitive humidity sensor a capacity of which is varied by moisture or water.

The electronic control unit 140 receives a humidity signal from the humidity sensor 130, and when a humidity of a reference value or higher is measured, the electronic control unit 140 generates a motor current signal for supplying an assistant steering force smaller than an assistant steering force corresponding to a current steering torque in response to a torque signal, a speed signal and a current speed of the vehicle.

That is, when a humidity lower than the reference value is measured, the electronic control unit 140 generates a motor current signal in response to a torque signal and a speed signal corresponding to the current torque and the current speed of the vehicle. On the other hand, when a humidity of the reference value or higher is measured, the electronic control unit generates a motor current signal for supplying an assistant steering force smaller than an assistant steering force set according to the current steering torque and the current speed of the vehicle.

A motor driving unit 150 supplies a current corresponding to the motor current signal output from the electronic control unit 140 to a motor 160, and the motor 160 supplies an assistant steering force as the current is supplied from the motor driving unit 150.

In the embodiment of the present invention, the assistant steering force smaller than the assistant steering force set according to the current steering torque and the current speed of the vehicle may be maintained until supply of the assistant steering force is stopped. That is, when an abnormal humidity is measured, the power steering apparatus according to the embodiment of the present invention can stop supply of the assistant steering force, securing a travel stability of the vehicle.

As described above, when a humidity of the power steering apparatus is excessively high, moisture or water may influence the power steering apparatus, causing an abnormal operation of the power steering apparatus. In the embodiment of the present invention, when a humidity of the power steering apparatus is higher than the reference value, a magnitude of the auxiliary steering force may be reduced, making it possible to prevent a malfunction of the power steering apparatus, and the driver may be compelled to be aware of a high humidity environment and manipulate the steering wheel with extra care.

The power steering apparatus according to the embodiment of the present invention may further include an alarm unit 170. The electronic control unit 140 outputs an alarm signal when the humidity of the power steering apparatus is the reference value or higher, and the alarm unit 170 receives the alarm signal from the electronic control unit 140, and outputs at least one of a visual alarm and an auditory alarm.

In the embodiment of the present invention, the humidity sensor 130 may be moduled with at least one of the torque sensor 110 and the electronic control unit 140. For example, the humidity sensor 130 may be mounted on one circuit board together with the torque sensor 110 to be moduled. Further, the humidity sensor 130 may be mounted on one circuit board together with the electronic control unit 140 to be moduled.

When the humidity sensor 130 is moduled with the torque sensor 110, since a first electric wire connecting the torque sensor 110 and the electronic control unit 140 and a second electric wire connecting the humidity sensor 130 and the electronic control unit 140 may be physically bound to each other, the first electric wire and the second electric wire electrically insulated from each other may be connected by one connector (not illustrated) and the connector may be connected to the electronic control unit 140, making it possible to conveniently install the humidity sensor 130. Further, since the torque sensor 110 for outputting an electrical signal may be strongly influenced by humidity, the humidity sensor 130 moduled with the torque sensor 110 may measure a humidity around the torque sensor 110, increasing an operation stability of the power steering apparatus.

In addition, even when the humidity sensor 130 and the electronic control unit 140 are moduled, since a humidity signal may be input and output on a circuit without using a wire connecting the humidity sensor 130 and the electronic control unit 140, the humidity sensor 130 may be easily installed. Since the electronic control unit 140 may include various electronic parts, it is so vulnerable to moisture or water that when the humidity sensor 130 is moduled with the electronic control unit 140, an operation stability of the power steering apparatus can be increased by measuring a humidity around the electronic control unit 140.

Figure 2:
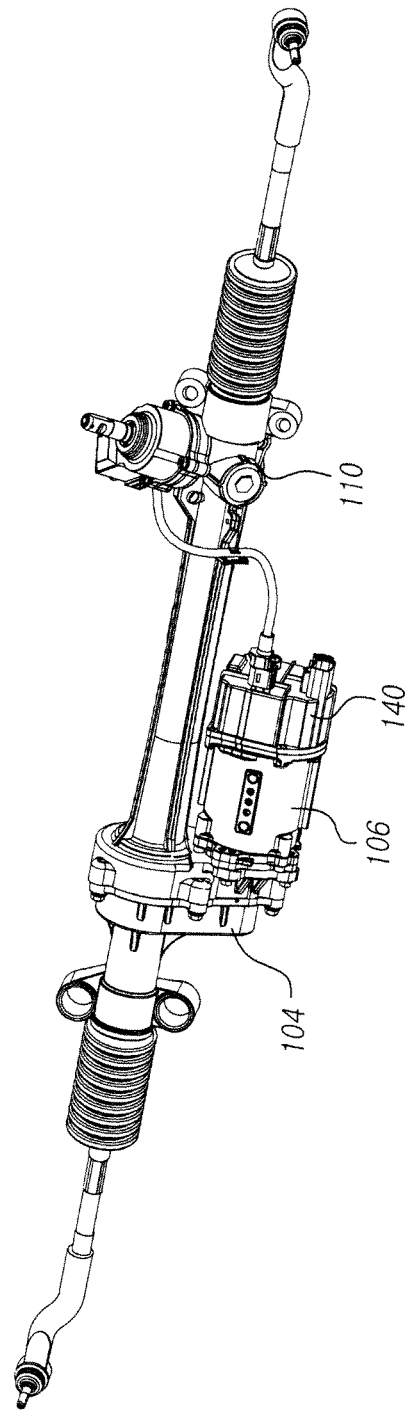
FIG. 2 illustrates an example of the power steering apparatus according to the embodiment of the present invention.
Figure 3:
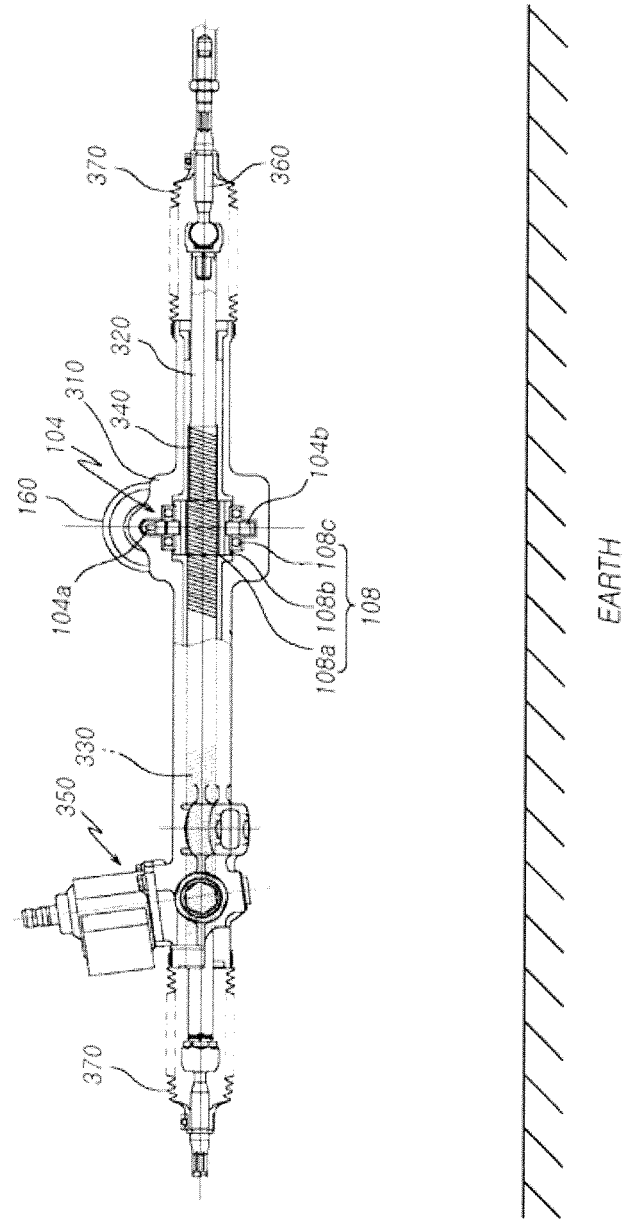
FIG. 3 illustrates an internal structure of the power steering apparatus according to the embodiment of the present invention.

FIG. 2 illustrates an example of the power steering apparatus according to the embodiment of the present invention. FIG. 3 illustrates an internal structure of the power steering apparatus according to the embodiment of the present invention. The power steering apparatus illustrated in FIGS. 2 and 3 is an example, and the power steering apparatus according to the embodiment of the present invention is not limited thereto.

As illustrated in FIG. 3, a rack bar 320 is installed within a rack housing 310, and a rack gear 330 and a screw 340 are formed near opposite ends of the rack bar 320, respectively. A pinion 350 connected to a steering shaft is engaged with the rack gear 330, and a ball screw unit 108 driven by an electric motor 160 is installed in the screw 340.

In the ball screw unit 108, a ball nut 108b rotated while surrounding the screw 340 is coupled to be rotatable by a ball bearing 108c installed on an inner surface of the rack housing 310. A steel ball 108a is interposed between the ball nut 108b and the screw 340. A reducer 104 for providing a reduced rotation output when transferring a driving force from the motor 160 to the ball nut 108b is provided at an outer side of the ball nut 108b, and the reducer 104 includes a worm shaft 104a installed at an end of a shaft of the motor 160, and a worm wheel 104b engaged with the work shaft 104a.

If the driver manipulates the steering wheel, a rotating force is transferred to the pinion 350 connected to the steering shaft 103, and the reducer 104 and the ball screw unit 108 are operated according to a driving force of the motor 160 so that a feeding force of the rack bar 320 is increased and decreased in a rotation direction of a wheel of the vehicle to achieve an optimum steering condition.

When the moisture or water introduced into the ball screw unit 108 is frozen due to a temperature drop, an operation of the power steering apparatus may not be smoothly performed. Thus, the power steering apparatus according to the embodiment of the present invention may include a humidity sensor 130 installed within the rack housing 310 covering the ball screw unit 108. Then, since there is a high possibility that the moisture or water may gather on a bottom surface of the rack housing 310 adjacent to the ground surface, the humidity sensor 130 may be installed on a bottom surface of the rack housing 310.

Further, the humidity sensor 130 may be installed adjacent to a region of the rack housing 310 coupled to the cover 370 covering a tie rod 360 or a region of the rack housing 310 coupled to the cover 370. In the embodiment of the present invention, the cover 370 may include a bellows. The tie rod 360 is connected to the rack bar 320, and the rack bar 320 may be moved horizontally and the tie rod 360 may be twisted. Thus, the cover 370 covering the tie rod 360 may be formed of a nonmetal material having a predetermined flexibility. In this way, since the cover 370 formed of a nonmetal material may be exposed to the outside and is close to a tire, the moisture or water is apt to penetrate through a coupling portion of the cover 370 and the rack housing 310. When the cover 370 is formed of a nonmetal material such as a polymer material, it may be difficult to firmly fix the humidity sensor 130 to the cover 370.

Thus, in the embodiment of the present invention, since the humidity sensor 130 is installed adjacent to a region of the rack housing 310 coupled to the cover 370 covering the tie rod 360 or a region of the rack housing 310 coupled to the cover 370, the moisture or water penetrating from the outside can be measured promptly, and a humidity can be measured stably by firmly fixing the humidity sensor 130.

Even if it was described above that all of the components of an embodiment of the present invention are coupled as a single unit or coupled to be operated as a single unit, the present invention is not necessarily limited to such an embodiment. That is, among the components, one or more components may be selectively coupled to be operated as one or more units.

In addition, since terms, such as "including," "comprising," and "having" mean that one or more corresponding components may exist unless they are specifically described to the contrary, it shall be construed that one or more other components can be included. All of the terminologies containing one or more technical or scientific terminologies have the same meanings that persons skilled in the art understand ordinarily unless they are not defined otherwise. A term ordinarily used like that defined by a dictionary shall be construed that it has a meaning equal to that in the context of a related description, and shall not be construed in an ideal or excessively formal meaning unless it is clearly defined in the present specification.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A power steering apparatus comprising:
   a torque sensor for detecting a steering torque applied to a steering wheel and outputting a torque signal corresponding to the steering torque;
   a speed sensor for detecting a speed of a vehicle and outputting a speed signal corresponding to the speed of the vehicle;
   a motor for su in an assist steering force in response to the torque signal and the speed signal;
   a humidity sensor for measuring a humidity of an interior of the power steering apparatus and outputting a humidity signal corresponding to the measured humidity; and
   an electronic control unit configured for receiving the humidity signal from the humidity sensor and configured for, when the measured humidity is at a reference value or higher, generating a motor current signal for reducing the assistant steering force supplied by the motor.

2. The power steering apparatus as claimed in claim 1, further comprising:
   an alarm unit configured for, when the electronic control unit outputs an alarm signal as value of the measured humidity is at the reference value or higher, receiving the alarm signal from the electronic control unit and outputting an alarm.

3. The power steering apparatus as claimed in claim 1, wherein the humidity sensor is coupled to at least one of the torque sensor and the electronic control unit.

4. The power steering apparatus as claimed in claim 1, wherein the humidity sensor is disposed within a housing covering a ball screw unit which moves according to a driving force of an electric motor to which a current corresponding to a motor current signal is supplied.

5. The power steering apparatus as claimed in claim 4, wherein the humidity sensor is disposed on a bottom surface of the housing adjacent to the ground surface.

6. The power steering apparatus as claimed in claim 4, wherein the humidity sensor is disposed adjacent to a region of the housing coupled to the cover covering a tie rod or adjacent to a region of the housing coupled to the cover.

* * * * *